(12) United States Patent
Baek et al.

(10) Patent No.: US 12,422,919 B2
(45) Date of Patent: Sep. 23, 2025

(54) SYSTEM AND METHOD FOR PROVIDING VIRTUAL REALITY SERVICE

(71) Applicant: ELECTRONICS AND TELECOMMUNICATIONS RESEARCH INSTITUTE, Daejeon (KR)

(72) Inventors: Seong Min Baek, Daejeon (KR); Youn Hee Gil, Daejeon (KR); Hee Sook Shin, Daejeon (KR); Cho Rong Yu, Daejeon (KR); Yong Ho Lee, Daejeon (KR); Sung Jin Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/763,858

(22) Filed: Jul. 3, 2024

(65) Prior Publication Data

US 2025/0155965 A1 May 15, 2025

(30) Foreign Application Priority Data

Nov. 9, 2023 (KR) ........................ 10-2023-0154236

(51) Int. Cl.
*G06T 7/246* (2017.01)
*A61B 5/11* (2006.01)
(Continued)

(52) U.S. Cl.
CPC .............. *G06F 3/011* (2013.01); *G06F 1/163* (2013.01); *G06T 7/70* (2017.01);
(Continued)

(58) Field of Classification Search
None
See application file for complete search history.

(56) References Cited

U.S. PATENT DOCUMENTS 7,174,039 B2 2/2007 Koo et al.
9,270,974 B2 2/2016 Zhang et al.
(Continued)

FOREIGN PATENT DOCUMENTS

KR         10-2113812 B1    5/2020
KR    10-2022-0098895 A    7/2022
(Continued)

OTHER PUBLICATIONS

Weipeng Xu et al., "Mo2Cap2: Real-time Mobile 3D Motion Capture with a Cap-mounted Fisheye Camera," IEEE TVCG Proc. VR 2019, Mar. 15, 2018.

*Primary Examiner* — Carl Adams

(57) ABSTRACT

A system and method for providing a virtual reality service is provided. For the system and method capable of realizing an interaction image of a user's full body, the system includes a head-mounted device mounted on the head of the user, a first RGB-D sensor configured to be installed on the head-mounted device, generate first image data of the user, and be arranged to face the user, a second RGB-D sensor configured to be installed on the head-mounted device, generate second image data of the user, and be arranged to face the user, and a calculation device configured to obtain a skeleton image of the user on the basis of the first image data and the second image data, obtain posture information of the user on the basis of the skeleton image of the user, and generate an interaction image on the basis of the posture information of the user.

16 Claims, 17 Drawing Sheets

(51) Int. Cl.
*G06F 1/16* (2006.01)
*G06F 3/01* (2006.01)
*G06F 3/14* (2006.01)
*G06T 7/70* (2017.01)

(52) U.S. Cl.
CPC ............... *G06T 2207/10024* (2013.01); *G06T 2207/10028* (2013.01); *G06T 2207/20212* (2013.01); *G06T 2207/30201* (2013.01)

(56) References Cited

U.S. PATENT DOCUMENTS

| | | |
|---|---|---|
| 9,807,340 B2 | 10/2017 | Hwang et al. |
| 11,544,865 B1 * | 1/2023 | Kurz .......................... G06T 7/73 |
| 2023/0288701 A1 * | 9/2023 | Norris .................. H04N 23/632 |

FOREIGN PATENT DOCUMENTS

| KR | 10-2022-0115412 A | 8/2022 |
|---|---|---|
| KR | 10-2534748 B1 | 5/2023 |
| WO | 2022/212325 A1 | 10/2022 |

* cited by examiner

- merging first image data and second image data to generate merged image data including image of user's full body — S1310
- changing viewpoint of merged image data — S1320
- inputting virtual face image corresponding to face area of user into merged image data — S1330
- inputting merged image data including input virtual face image into learning model and obtaining first skeleton image from learning model — S1340
- defining virtual face image as highest level joint node and obtaining second skeleton image including highest level joint node and lower joint nodes — S1350

SYSTEM AND METHOD FOR PROVIDING VIRTUAL REALITY SERVICE

CROSS REFERENCE TO RELATED APPLICATION

The present application claims priority to Korean Patent Application No. 10-2023-0154236, filed Nov. 9, 2023, the entire contents of which are incorporated herein for all purposes by this reference.

BACKGROUND OF THE INVENTION

Field of the Invention

The exemplary embodiments of the present disclosure relate to a system and method for providing a virtual reality service and, more particularly, to a system and method for providing a virtual reality service and capable of realizing an interaction image of a user's full body.

Description of the Related Art

Virtual reality technology may refer to technology allowing a user to have a realistic experience in a virtual environment created on a computer. In general, in order to provide the user with the virtual reality service, the user may wear a head-mounted display (HMD), which is a display device mounted on the head of the user. The virtual reality service may be provided to the user through the HMD referred to as the head-mounted device.

Recently, a character image or the like representing a user has been used in a virtual reality service. The character image may move according to the motion of the user. However, there is a problem that the character image moving according to the motion of the user is limited to the face or the upper half of the body of the user.

SUMMARY OF THE INVENTION

The present disclosure is for solving various problems including the problem described above, and an objective of the present disclosure is to provide a system and method for providing a virtual reality service and capable of realizing an interaction image of a user's full body. However, such a task is illustrative and does not limit the scope of the present disclosure.

In order to solve the above-described problems, according to an exemplary embodiment of the present disclosure, there is provided a system for providing a virtual reality service, the system including: a head-mounted device mounted on the head of a user; a first RGB-D sensor configured to be installed on the head-mounted device, generate first image data of the user, and be arranged to face the user; a second RGB-D sensor configured to be installed on the head-mounted device, generate second image data of the user, and be arranged to face the user; and a calculation device configured to obtain a skeleton image of the user on the basis of the first image data and the second image data, obtain posture information of the user on the basis of the skeleton image of the user, and generate an interaction image on the basis of the posture information of the user.

In the exemplary embodiment, the calculation device may unify a coordinate system of the first image data and a coordinate system of the second image data into one coordinate system.

In the exemplary embodiment, the calculation device may merge the first image data and the second image data to generate merged image data including an image of the user's full body, and change a viewpoint of the merged image data.

In the exemplary embodiment, the calculation device may input a virtual face image corresponding to a face area of the user into the merged image data.

In the exemplary embodiment, the calculation device may input the merged image data including the input virtual face image into a learning model and obtains a first skeleton image of the user from the learning model.

In the exemplary embodiment, the calculation device may define the virtual face image as the highest level joint node and obtain a second skeleton image including lower level joint nodes defined on the basis of the highest level joint node.

In the exemplary embodiment, the calculation device may obtain the posture information of the user on the basis of one of the first skeleton image and the second skeleton image.

In the exemplary embodiment, the system may further includes a third RGB-D sensor configured to be installed on the head-mounted device, generate third image data of the user, and be arranged to face the user.

In the exemplary embodiment, the calculation device may obtain the skeleton image of the user on the basis of the first image data to the third image data.

In the exemplary embodiment, the first image data may include an image of an upper half of the user's body, the second image data may include an image of a lower half of the user's body viewed from a first direction, and the third image data may include an image of the lower half of the user's body viewed from a second direction.

In order to solve the above-described problems, according to the exemplary embodiment of the present disclosure, there is provided a method for providing a virtual reality service to a user on the basis of image data received from a plurality of sensors installed on a head-mounted device mounted on the user's head, the method including: receiving first image data including an image of an upper half of the user's body from a first RGB-D sensor among the plurality of sensors; receiving second image data including an image of a lower half of the user's body viewed from a first direction from a second RGB-D sensor among the plurality of sensors; obtaining a skeleton image of the user on the basis of the first image data and the second image data; obtaining posture information of the user on the basis of the skeleton image of the user; and generating an interaction image on the basis of the posture information of the user.

In the exemplary embodiment, the obtaining of the skeleton image of the user may unify a coordinate system of the first image data and a coordinate system of the second image data into one coordinate system.

In the exemplary embodiment, the obtaining of the skeleton image of the user may include: merging the first image data and the second image data to generate merged image data including an image of the user's full body; and changing a viewpoint of the merged image data.

In the exemplary embodiment, the obtaining of the skeleton image of the user may further include inputting a virtual face image corresponding to a face area of the user into the merged image data after the viewpoint is changed.

In the exemplary embodiment, the obtaining of the skeleton image of the user may further include inputting the merged image data including the input virtual face image into a learning model and obtaining a first skeleton image from the learning model.

In the exemplary embodiment, the obtaining of the skeleton image of the user may further include defining the virtual face image as the highest level joint node and obtaining a second skeleton image including the highest level joint node and lower level joint nodes.

In the exemplary embodiment, the obtaining of the posture information of the user may further include obtaining the posture information of the user on the basis of one of the first skeleton image and the second skeleton image.

In the exemplary embodiment, the method may further include receiving third image data of the user from a third RGB-D sensor among the plurality of sensors.

In the exemplary embodiment, the obtaining of the skeleton image of the user may obtain the skeleton image of the user on the basis of the first third image data to the third image data.

In the exemplary embodiment, the third image data may include an image of the lower half of the user's body viewed from a second direction intersecting the first direction.

According to the exemplary embodiments of the present disclosure configured as described above, a system and method for providing a virtual reality service and capable of realizing an interaction image of a user's full body may be implemented. Naturally, the scope of the present disclosure is not limited by such effects.

According to the present disclosure, a system and method for providing a virtual reality service may obtain more accurate posture information of a user.

According to the present disclosure, a system and method for providing a virtual reality service may provide a virtual reality service that is not limited by a detection range of sensors.

BRIEF DESCRIPTION OF THE DRAWINGS

FIG. 7 is a flowchart illustrating details of a step of obtaining a skeleton image of a user among the steps in FIG. 6.

DETAILED DESCRIPTION OF THE INVENTION

Figure 1:
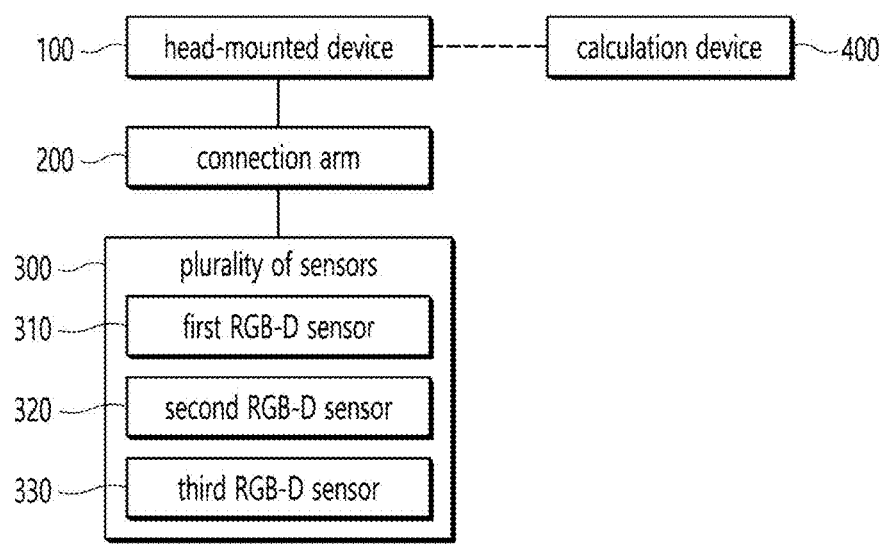
FIG. 1 is a conceptual view schematically illustrating a system for providing a virtual reality service according to an exemplary embodiment of the present disclosure.

The present disclosure may be modified in various ways and may have various exemplary embodiments, and thus specific exemplary embodiments will be exemplified and described in detail in the detailed description. The effects and features of the present disclosure and the methods of achieving the same will become apparent with reference to the exemplary embodiments described below in detail in conjunction with the drawings. However, the present disclosure is not limited to the exemplary embodiments disclosed below, but will be implemented in various forms.

Hereinafter, the exemplary embodiments of the present disclosure will be described in detail with reference to the attached drawings. When describing with reference to the drawings, identical or corresponding components will be given the same reference numerals, and duplicate descriptions thereof will be omitted.

In the following exemplary embodiments, terms such as first and second are used not in a limited meaning but for the purpose of distinguishing one component from another component. In addition, in the exemplary embodiments below, the singular forms are intended to include the plural forms as well, unless the context clearly indicates otherwise.

In the following exemplary embodiments, when various components such as layers, films, areas, plates, etc. are said to be "on" or "above" other components, this is not only the case when they are "directly on" or "directly above" other components, but also other intervening components may also be present therebetween.

In addition, in the drawings, the size of the components may be exaggerated or reduced for convenience of description. For example, the size and thickness of each component shown in the drawings or views are arbitrarily represented for the convenience of description, so the embodiments of the present disclosure are not necessarily limited to the illustrated drawings or views.

In the following exemplary embodiments, terms such as "comprise", "include", or "have" mean that a feature or a component described in the specification exists, and the possibility that one or more other features or components may be added is not precluded.

In the following exemplary embodiments, when a part of a film, area, component, etc. is said to be on or above the other part, it is not only the case the part is directly on or above the other part, but also the case where another film, area, component, etc. is also present therebetween.

Where certain exemplary embodiments are otherwise implementable, a specific process order may also be performed different from the described order. For example, two processes described in succession may be performed substantially and simultaneously, or may be performed in an order opposite to the described order.

In the present specification, "A and/or B" indicates A, B, or A and B. In addition, "at least one of A and B" indicates the case of A, B, or A and B.

In the following exemplary embodiments, when a film, area, component, and/or the like are connected to a target, this includes not only a case where the film, area, and/or component are directly connected to the target, but also a case where the film, area, and/or component are indirectly connected to the target by means of another film, another area, and/or another component that are interposed therebetween. For example, in the present specification, when it is said that a film, area, component, and/or the like are electrically connected to a target, this includes a case where the film, area, component, and/or the like are directly and electrically connected to the target, and/or includes a case where the film, area, component, and/or the like are indirectly and electrically connected to the target by means of another film, another area, another component, and/or the like that are interposed therebetween.

In the following exemplary embodiments, an x-axis, y-axis, and z-axis are not limited to the three axes in the Cartesian coordinate system, but may be interpreted in a broad sense including these axes. For example, the x-axis, y-axis, and z-axis may be orthogonal to each other, but may also refer to different directions that are not orthogonal to each other.

Hereinafter, based on the above-described content, a detailed description of a system and method for providing a virtual reality service according to a preferred exemplary embodiment of the present disclosure is as follows.

FIG. 1 is a conceptual view schematically illustrating a system for providing a virtual reality service according to the exemplary embodiment of the present disclosure.

As shown in FIG. 1, according to the exemplary embodiment of the present disclosure, the system for providing the virtual reality service may include a head-mounted device 100, a plurality of sensors 300, and a calculation device 400, and the system for providing the virtual reality service may further include a connection arm 200, and the head-mounted device 100 and the plurality of sensors 300 may be connected to each other by the connection arm 200.

The head-mounted device 100 may be a display device wearable on the head of a user. Through the head-mounted device 100, the user may receive a virtual reality service (or an augmented reality service or a mixed reality service). In the present specification, only the virtual reality service is described for convenience of description, but this may be understood as a concept including the augmented reality and mixed reality services.

The plurality of sensors 300 may be RGB-D sensors capable of generating depth data as well as optical image data. For example, each RGB-D sensor may generate the depth data by using structured light, or by using a Lidar using a ToF sensor.

The plurality of sensors 300 may include a first RGB-D sensor 310 and a second RGB-D sensor 320. The plurality of sensors 300 may further include a third RGB-D sensor. In addition, in some cases, the plurality of sensors 300 may also further include other RGB-D sensors.

The plurality of sensors 300 may be installed on the head-mounted device to face the user wearing the head-mounted device. For example, the first RGB-D sensor 310 may be installed on the head-mounted device 100 and generate first image data including an image of the upper half of the body of the user wearing the head-mounted device. For example, the second RGB-D sensor 320 may be installed on the head-mounted device 100 and generate second image data including an image of the lower half of the body of the user. The second image data may include an image of the lower half of the body of the user viewed from a first direction. For example, the third RGB-D sensor 330 may be installed on the head-mounted device 100 and generate third image data including an image of the lower half of the body of the user. The third image data may include an image of the lower half of the body of the user viewed from a second direction. The first direction may be different from the second direction. For example, the second image data may include an image of the lower half of the body of the user viewed from a diagonal direction to the left of the user. For example, the third image data may include an image of the lower half of the body of the user viewed from a diagonal direction to the right of the user.

The calculation device 400 may be a computing device or a user terminal. The calculation device 400 may be a component included in the head-mounted device 100 or may be an additional component separated from the head-mounted device 100. For example, the calculation device 400 may receive data from the plurality of sensors 300. The calculation device 400 may apply an algorithm according to a pre-stored command to the received data.

For example, the calculation device 400 may obtain a skeleton image of the user on the basis of the first image data and the second image data. The skeleton image of the user may be information about three-dimensional joint positions of the body of the user. For example, the skeleton image of the user may be information about the positions of 16 joints in the body of the user. For example, the skeleton image of the user may include coordinate information of the head, neck, chest, shoulders, elbows, wrists, pelvis, hips, knees, feet, ankles, etc. The calculation device 400 may generate image data in which particular coordinate information is displayed as one node.

The calculation device 400 may obtain posture information of the user on the basis of the skeleton image of the user.

The posture information of the user may be information for realizing postures of the user as information on a character or image realized in virtual reality. For example, the posture information of the user may include information about the user's postures such as standing, sitting, or lying states of the user as well as information about the user's motion such as the degree of bending or rotation of the user's arms or legs.

The calculation device 400 may generate an interaction image corresponding to a motion of the user on the basis of the posture information of the user.

The motion of the user may be information about the movements of the joints of the user. For example, when points corresponding to the user's joints are recognized, coordinate information of the points corresponding to the joints may be derived. When the coordinate information is tracked, the motion of the user (i.e., the movement information of the user) may be obtained.

The interaction image may refer to an image of a character and the like corresponding to the user in virtual reality on the basis of the posture information and motion information of the user. The Interaction image may be used to realize movements corresponding to the motion of the user in the virtual reality.

The connection arm 200 may be coupled to the head-mounted device 100. One side of the connection arm 200 may be coupled to the head-mounted device 100, and the other side of the connection arm 200 may be coupled to each of the plurality of sensors 300. The connection arm 200 may include a plurality of joints and perform various movements by using the plurality of joints. For example, the plurality of sensors 300 and the head-mounted device 100 may be connected to each other by the connection arm 200.

Figure 2:
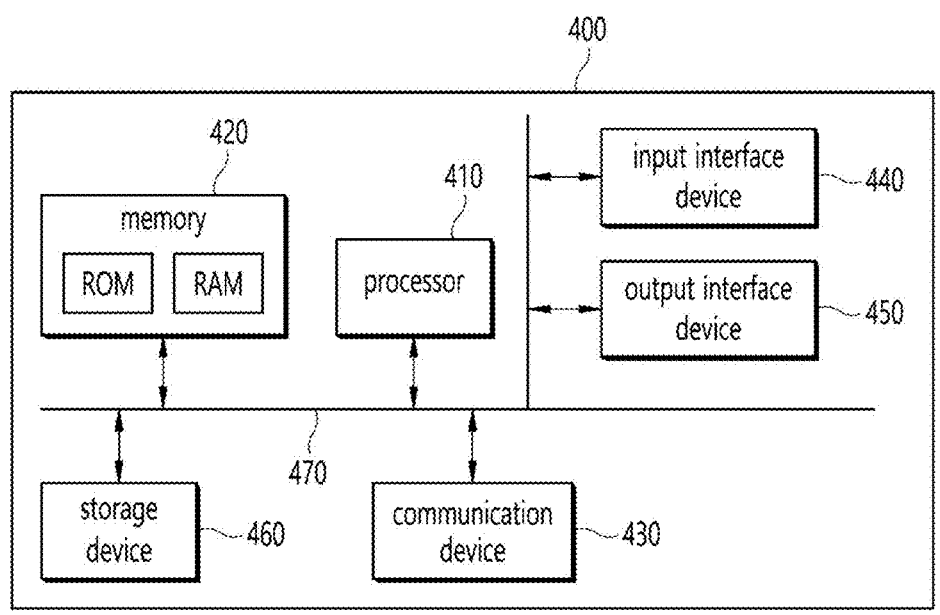
FIG. 2 is a conceptual view schematically illustrating a calculation device in FIG. 1.

FIG. 2 is a conceptual view schematically illustrating a calculation device in FIG. 1.

For reference, in the description of FIG. 2, content that is the same or overlapping with the content described above may be omitted.

The calculation device 400 may include at least one processor 410, memory 420, and communication device 430 connected to a network to perform communication. In addition, the calculation device 400 may further include an input interface device 440, an output interface device 450, a storage device 460, etc. The components included in the calculation device 400 may be connected to each other by a bus to communicate with each other.

However, the components each included in the calculation device 400 may also be connected to each other through an individual interface or individual bus centered on the processor 410, rather than the common bus. For example, the processor 410 may also be connected to at least one of the memory 420, the communication device 430, the input interface device 440, the output interface device 450, and the storage device 460 through a dedicated interface.

The processor 410 may execute a program command stored in at least one of the memory 420 and the storage device 460. The processor 410 may refer to a central processing unit (CPU), a graphics processing unit (GPU), or a dedicated processor on which methods according to the exemplary embodiments of the present disclosure are performed. Each of the memory 420 and the storage device 460 may consist of at least one of a volatile storage medium and a non-volatile storage medium. For example, the memory 420 may consist of at least one of a read only memory (ROM) and a random access memory (RAM).

Figure 3:
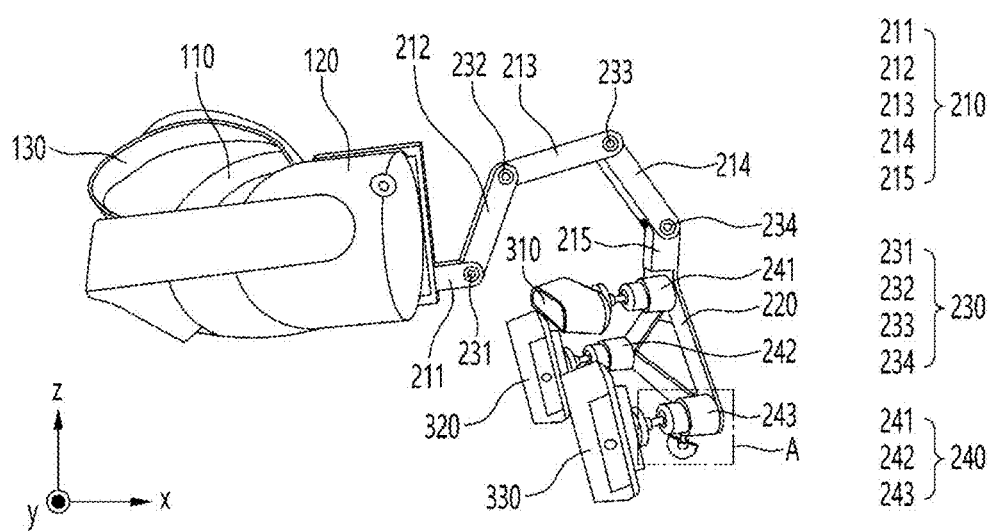
FIG. 3 is a side view illustrating an example of a head-mounted device, a connection arm, and a plurality of sensors in FIG. 1.
Figure 4:
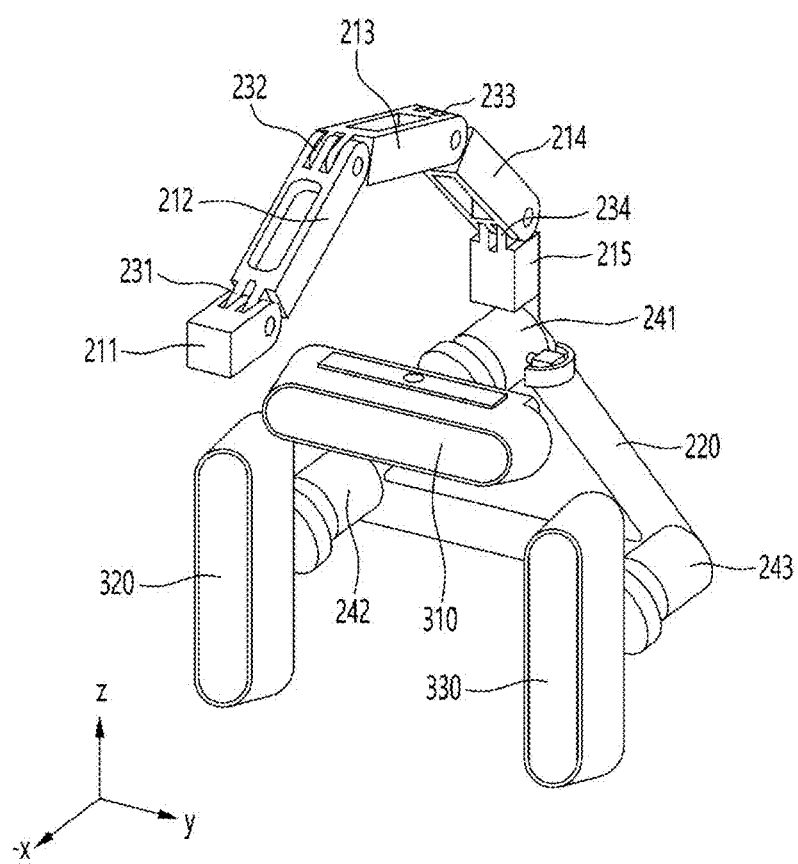
FIG. 4 is a perspective view illustrating an example of the connection arm and the plurality of sensors in FIG. 1.

FIG. 3 is a side view illustrating an example of the head-mounted device, the connection arm, and the plurality of sensors in FIG. 1. FIG. 4 is a perspective view illustrating an example of the connection arm and the plurality of sensors in FIG. 1

For reference, in the description of FIGS. 3 and 4, content that is the same or overlapping with the content described above may be omitted.

In addition, according to FIG. 3, the head-mounted device 100 of the present disclosure is illustrated as a type of the mounted device configured to provide a virtual reality service and be worn on the head of a user, but this is just one example. The head-mounted device 100 may refer to a mounted device in the form of smart glasses or various other types of exemplary embodiments. That is, the scope of rights of the present disclosure is not affected by the type of the head-mounted device 100.

According to an example, the head-mounted device 100 may include: an eyepiece unit 110 for transmitting visual information to the eyes of a user; a main body unit 120 for calculating visual information transmitted through the eyepiece unit 110; and a wearing unit 130 for fastening the eyepiece unit 110 and the main body unit 120 to the user's body so as to enable the user to wear them.

According to an example, the eyepiece unit 110 may use various types of lenses, such as a Holo lens and a recursive lens. The eyepiece unit 110 may be arranged close to the user's eyes and may have a form configured to provide visual information to the user's eyes.

According to an example, the main body 120 may include an internal processor (not shown), an internal memory (not shown), and an internal interface (not shown), which are for calculating visual information transmitted to a user through the eyepiece unit 110 and outputting the visual information to the eyepiece unit 110. Descriptions of the internal processor (not shown) and internal memory (not shown) may be replaced with the descriptions of the processor 410 and memory 420 in the descriptions of FIG. 2. The description of the internal interface (not shown) may be replaced with the descriptions of the communication device 430, the input interface device 440, and the output interface device 450 in the descriptions of FIG. 2.

According to an example, the wearing unit 130 may be a component configured to be wearable on the user's head. For example, the wearing unit 130 may have various forms such as a form of strap or a form of helmet.

The connection arm 200 may include the plurality of joints and the plurality of sub-arms connected by the plurality of joints. For example, the connection arm 200 may include: a first sub-arm 211 fastened to the head-mounted device 100; a second sub-arm 212 fastened to the first sub-arm 211; a third sub-arm 213 fastened to the second sub-arm 212; a fourth sub-arm 214 fastened to the third sub-arm 213; and a fifth sub-arm 215 fastened to the fourth sub-arm 214.

For example, the first joint unit 231 may connect the first sub-arm 211 and the second sub-arm 212 to each other. The first joint unit 231 may rotate the first sub-arm 211 or the second sub-arm 212 in at least one direction. The first joint unit 231 may be a rotation shaft for turning the first sub-arm 211 or the second sub-arm 212 in the at least one direction.

For example, the second joint unit 232 may connect the second sub-arm 212 and the third sub-arm 213 to each other. The second joint unit 232 may rotate the second sub-arm 212 or the third sub-arm 213 in at least one direction. The second joint unit 232 may be a rotation shaft for turning the second sub-arm 212 or the third sub-arm 213 in the at least one direction.

For example, the third joint unit 233 may connect the third sub-arm 213 and the fourth sub-arm 214 to each other. The third joint unit 233 may rotate the third sub-arm 213 or the fourth sub-arm 214 in at least one direction. The third joint unit 233 may be a rotation shaft for turning the third sub-arm 213 or the fourth sub-arm 214 in the at least one direction.

For example, the fourth joint unit 234 may connect the fourth sub-arm 214 and the fifth sub-arm 215 to each other. The fourth joint unit 234 may rotate the fourth sub-arm 214 or the fifth sub-arm 215 in at least one direction. The fourth joint unit 234 may be a rotation shaft for turning the fourth sub-arm 214 or the fifth sub-arm 215 in the at least one direction.

For example, the fifth sub-arm 215 may be connected to a sensor fixing unit 220 equipped with the plurality of sensors 300. The sensor fixing unit 220 is coupled to or fastened to the plurality of sensors 300 and helps arrange the plurality of sensors 300 to face a desired direction.

The plurality of sensors 300 may include a first RGB-D sensor 310 and a second RGB-D sensor 320. The plurality of sensors 300 may further include a third RGB-D sensor 330. In addition, in some cases, the plurality of sensors 300 may further include other RGB-D sensors. The detailed descriptions of the plurality of sensors 300 are replaced with the above-described content.

The RGB-D sensors may be of different types or have different specifications depending on a target being detected. Alternatively, the RGB-D sensors may be arranged differently depending on the target being detected.

For example, the first RGB-D sensor 310 may detect the upper half of the user's body (in this case, the user's face may be excluded from the concept of the upper half of the body) Accordingly, in order to detect the upper half of the user's body, the first RGB-D sensor 310 may be arranged at a higher position than other RGB-D sensors. In order to detect the upper half of the user's body, the first RGB-D sensor 310 may be arranged to detect a wider range in the left and right directions of the user, rather than in the up and down directions of the user.

For example, it is assumed that a range in which the first RGB-D sensor 310 detects a target has a 1-1 width and a 1-2 width that intersects the 1-1 width and the 1-1 width is wider than the 1-2 width. In this case, the first RGB-D sensor 310 may be arranged so that the 1-1 width is approximately parallel to the left and right directions of the user in order to detect the upper half of the user's body.

For example, the second RGB-D sensor 320 may detect the lower half of the user's body and at least a portion of the upper half of the user's body. Accordingly, the second RGB-D sensor 320 may be arranged to detect a wider range in the up and down directions of the user than in the left and right directions of the user in order to detect the lower half of the user's body and at least the portion of the upper half of the user's body.

For example, it is assumed that a range in which the second RGB-D sensor 320 detects a target has a 2-1 width and a 2-2 width that intersects the 2-1 width and the 2-1 width is wider than the 2-2 width. In this case, the second RGB-D sensor 320 may be arranged so that the 2-1 width is approximately parallel to the up and down directions of the user in order to detect the upper half of the user's body.

For example, the third RGB-D sensor 330 may detect the lower half of the user's body and at least a portion of the upper half of the user's body. Accordingly, the third RGB-D sensor 330 may be arranged to detect a wider range in the up and down directions of the user than in the left and right directions of the user in order to detect the lower half of the user's body and at least the portion of the upper half of the user's body.

For example, it is assumed that a range in which the third RGB-D sensor 330 detects a target has a 3-1 width and a 3-2 width that intersects the 3-1 width and the 3-1 width is wider than the 3-2 width. In this case, the third RGB-D sensor 330 may be arranged so that the 3-1 width is approximately parallel to the up and down directions of the user in order to detect the upper half of the user's body.

The first connection unit 241 may be a component configured to connect the first RGB-D sensor 310 and the sensor fixing unit 220 to each other. The second connection unit 242 may be a component configured to connect the second RGB-D sensor 320 and the sensor fixing unit 220 to each other. Alternatively, the third connection unit 243 may be a component configured to connect the third RGB-D sensor 330 and the sensor fixing unit 220 to each other. In addition, another RGB-D sensor may be additionally provided therein, and the additionally provided RGB-D sensor may be connected to the sensor fixing unit 220 or may be fastened to the sensor fixing unit 220 by an additionally provided connection unit.

Figure 5:
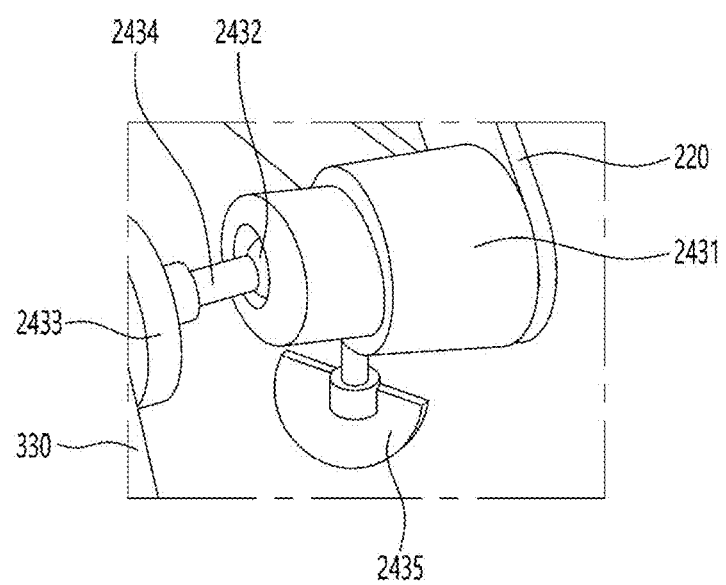
FIG. 5 is a perspective view schematically illustrating an example of area A in FIG. 3.

FIG. 5 is a perspective view schematically illustrating an example of area A in FIG. 3.

For reference, in the description of FIG. 5, content that is the same or overlapping with the content described above may be omitted. In addition, FIG. 5 merely shows an example of the third connection unit 243, and does not limit the scope of rights of the present disclosure. In addition, FIG. 5 is for describing the third connection unit 243, but the description of the third connection unit 243 may be equally applied to the first connection unit 241 and the second connection unit 242 in the same manner.

As shown in FIG. 5, the third connection unit 243 may include: a first body unit 2431 connected to the sensor fixing unit 220; a first fixing unit 2433 connected to the third RGB-D sensor 330; a first rod 2434 connecting the first fixing unit 2433 and the first body unit 2431 to each other; and a first ball joint 2432.

For example, the first body unit 2431 may have a structure into which the first ball joint 2432 may be recessed. The first ball joint 2432 is arranged inside the recess structure of the first body unit 2431, and the first rod 2434 extending from the first ball joint 2432 toward the first fixing unit 2433 may be arranged outside of the first body unit 2431. Accordingly, one end of the first body unit 2431 is connected to the sensor fixing unit 220, and the other end of the first body unit 2431 has the recess structure capable of placing the first ball joint 2432 therein. The recess structure may have an inner surface corresponding to the shape of the first ball joint 2432 so that the first ball joint 2432 may rotate freely therein.

For example, the third connection unit 243 may further include a first threaded unit 2435 for fixing the rotational movement of the first ball joint 2432. The first threaded unit 2435 is inserted toward the first ball joint 2432 along a through hole formed in the first body unit 2431, and one end of the first threaded unit 2435 may be in contact with the first ball joint 2432. The first threaded unit 2435 and the first body unit 2431 are screwed together and coupled to each other, and one end of the first threaded unit 2435 in contact with the first ball joint 2432 by the screw coupling may fix the movement of the first ball joint 2432. The user may adjust the movement of the first ball joint 2432 or fix the first ball joint 2432 by loosening or tightening the screw coupling of the first threaded unit 2435.

Figure 6:
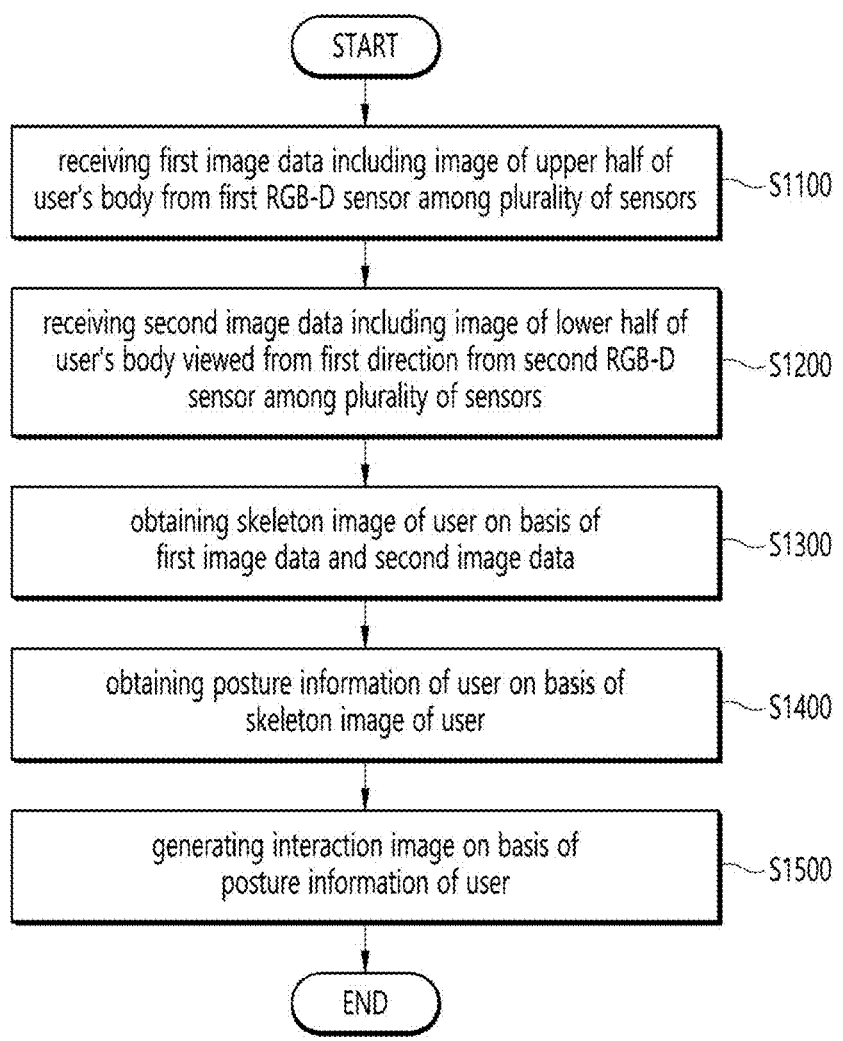
FIG. 6 is a flowchart schematically illustrating a method for providing a virtual reality service according to the exemplary embodiment of the present disclosure.

FIG. 6 is a flowchart schematically illustrating a method for providing a virtual reality service according to the exemplary embodiment of the present disclosure. FIG. 7 is a flowchart illustrating details of a step of obtaining a skeleton image of a user among the steps in FIG. 6.

For reference, in the descriptions of FIGS. 6 and 7, content that is the same or overlapping with the content described above may be omitted. In addition, a component that is a subject implementing the method for providing the virtual reality service according to the exemplary embodiment of the present disclosure may be the above-described calculation device 400 or a processor included in the calculation device 400.

As shown in FIG. 6, the method for providing the virtual reality service (hereinafter referred to as a provision method) according to the exemplary embodiment of the present disclosure may provide the virtual reality service to a user on the basis of image data received from a plurality of sensors 300 installed on a head-mounted device worn on the user's head.

In the exemplary embodiment, the provision method may include: step S1100 of receiving first image data of a user from a first RGB-D sensor 310 among a plurality of sensors 300; and step S1200 of receiving second image data of the user from a second RGB-D sensor 320 among the plurality of sensors 300. The provision method may further include a step of receiving third image data of the user from a third RGB-D sensor 330 among the plurality of sensors 300.

In the exemplary embodiment, the provision method may include: step S1300 of obtaining a skeleton image of the user on the basis of the first image data and the second image data; step S1400 of obtaining posture information of the user on the basis of the skeleton image of the user; and step S1500 of generating an interaction image on the basis of the posture information of the user. The interaction image may include information on movements corresponding to the motion of the user.

Alternatively, the provision method may include: obtaining a skeleton image of the user on the basis of the first to third image data; obtaining posture information of the user on the basis of the skeleton image of the user; and generating an interaction image on the basis of the posture information of the user. The interaction image may have information on movements corresponding to the motion of the user.

In the exemplary embodiment, the first image data may include an image of the upper half of the user's body. The second image data may include an image of the lower half of the user's body viewed from a first direction. The third image data may include an image of the lower half of the user's body viewed from a second direction. In this case, the second direction may be a direction intersecting the first direction.

For example, the second image data may include an image of the lower half of the user's body viewed from approximately the left side of the user. For example, the third image data may include an image of the lower half of the user's body viewed from approximately the right side of the user.

As shown in FIG. 7, in the exemplary embodiment, step S1300 of obtaining the skeleton image of the user may include: step S1310 of merging the first image data and the second image data to generate merged image data including an image of the user's full body; and step S1320 of changing a viewpoint of the merged image data.

In the exemplary embodiment, step S1300 of obtaining the skeleton image of the user may further include step S1330 of inputting a virtual face image corresponding to the user's face area to the merged image data after the viewpoint is changed.

The virtual face image may be an image for replacing the user's facial image that is not captured by the plurality of sensors 300. The virtual face image may be recognized as one node. The node corresponding to the virtual face image may be defined as the highest level joint node among the joint nodes of the user.

In the exemplary embodiment, step S1300 of obtaining the skeleton image of the user may further include step S1340 of inputting the merged image data including the input virtual face image into a learning model and obtaining a first skeleton image from the learning model. The first skeleton image may be result values of the learning model, and the merged image data including the virtual face image (hereinafter referred to interchangeably as the input image data) may be input values of the learning model. Since learning models such as DNN are trained on the entire human body, it is difficult for the learning models such as DNN to operate properly when there is no input corresponding to the user's face.

In the exemplary embodiment, step S1300 of obtaining the skeleton image of the user may further include step S1350 of defining the virtual face image as the highest level joint node and obtaining a second skeleton image including the highest level joint node and lower level joint nodes. In this case, the second skeleton image may be generated by Articulated-ICP.

The lower level joint nodes may be defined on the basis of the highest level joint node. For example, a lower level joint node is a node connected to the highest level joint node, and the lower level joint node may also be connected to a lower level joint node further down therefrom. The lower level joint node may connect the lower level joint node further down and the highest level joint node to each other.

For example, in a case where the highest level joint node is the head, the neck may be a lower level joint node down from the head. The shoulder connected to the neck may be a lower level joint node than the neck. A node corresponding to the neck may be a node that connects nodes corresponding to the shoulders and a node corresponding to the head to each other.

Alternatively, in the exemplary embodiment, step S1300 of obtaining the skeleton image of the user may include: merging the first to third image data to generate merged image data including an image of the user's full body; and changing a viewpoint of the merged image data. The process after the first to third image data are merged may be clearly understood by those skilled in the art from the above-described descriptions.

In the exemplary embodiment, step S1400 of obtaining the posture information of the user includes obtaining the posture information of the user on the basis of one of the first skeleton image and the second skeleton image.

The posture information of the user may be derived on the basis of the skeleton image, and may include information about what motion the user is taking. The calculation device 400 may generate an interaction image on the basis of the skeleton image, and the calculation device 400 may also generate an interaction image on the basis of the skeleton image and information about the motion of the user.

Figure 8:
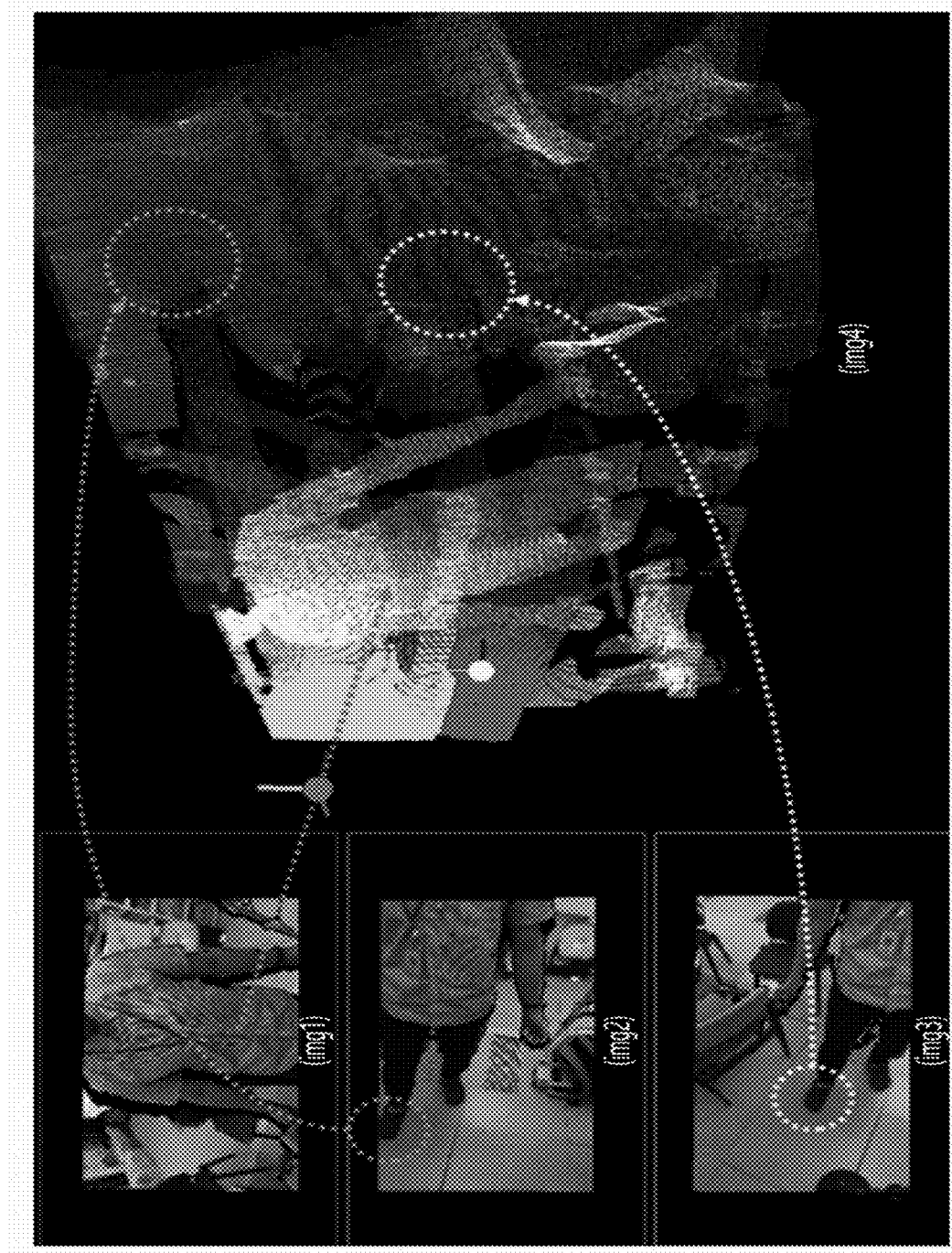
FIG. 8 is an example illustrating first to third image data respectively generated from first to third RGB-D sensors in FIG. 1.

FIG. 8 is an example illustrating first to third image data respectively generated from the first to third RGB-D sensors 310 to 330 in FIG. 1.

For reference, FIG. 8 may be a view illustrating an example of the first to third image data having different coordinate systems. For reference, in the description of FIG. 8, content that is the same or overlapping with the content described above may be omitted.

As shown in FIG. 8, it is confirmed that the above-described first image data img1 to third image data img3 have respective coordinate systems different from each other. As shown in FIG. 8, it is confirmed that the above-described first image data img1 to third image data img3 have respective coordinate systems different from each other.

In addition, as shown in FIG. 8, and as confirmed in a three-dimensional image img4 obtained from the first RGB-D sensor 310 to the third RGB-D sensor 330, it is confirmed that depth data obtained from the first RGB-D sensor 310, depth data obtained from the second RGB-D sensor 320, and depth data obtained from the third RGB-D sensor 330 also have coordinate systems different from each other.

In order to obtain a skeleton image corresponding to a user, it is required to unify the coordinate systems of the respective information represented in the first image data img1 to third image data img3 and the depth images, which are shown in FIG. 8.

Figure 9:
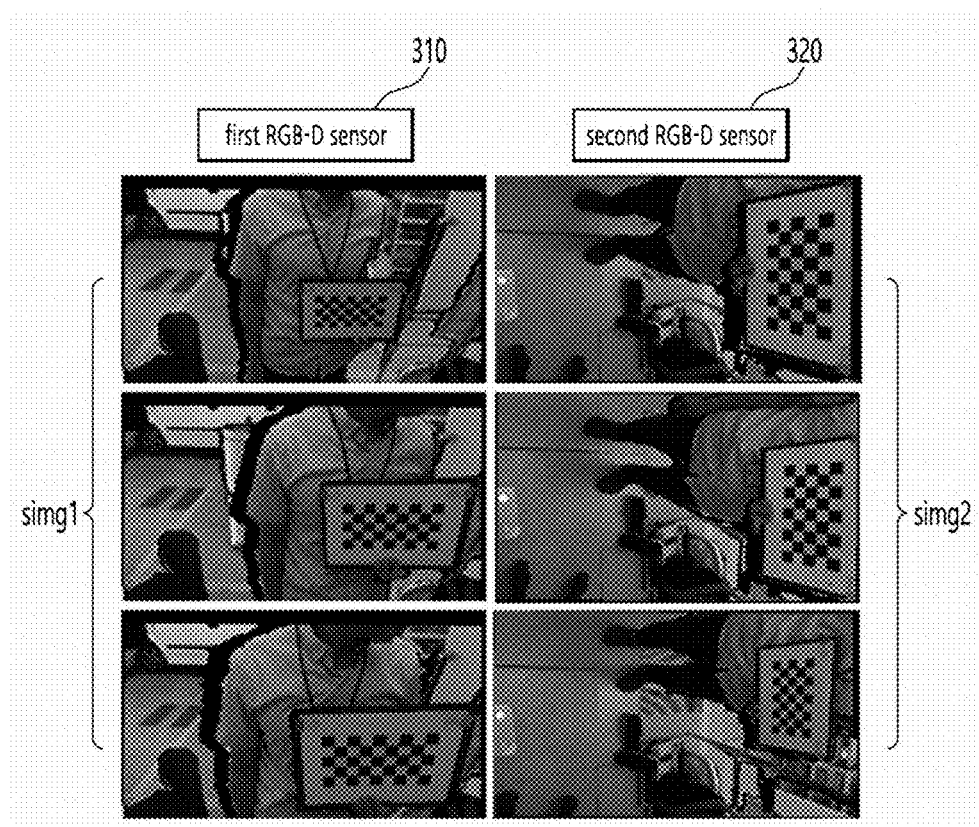
FIG. 9 is an example illustrating unifying of respective coordinate systems of the first image data and second image data in FIG. 8.
Figure 10:
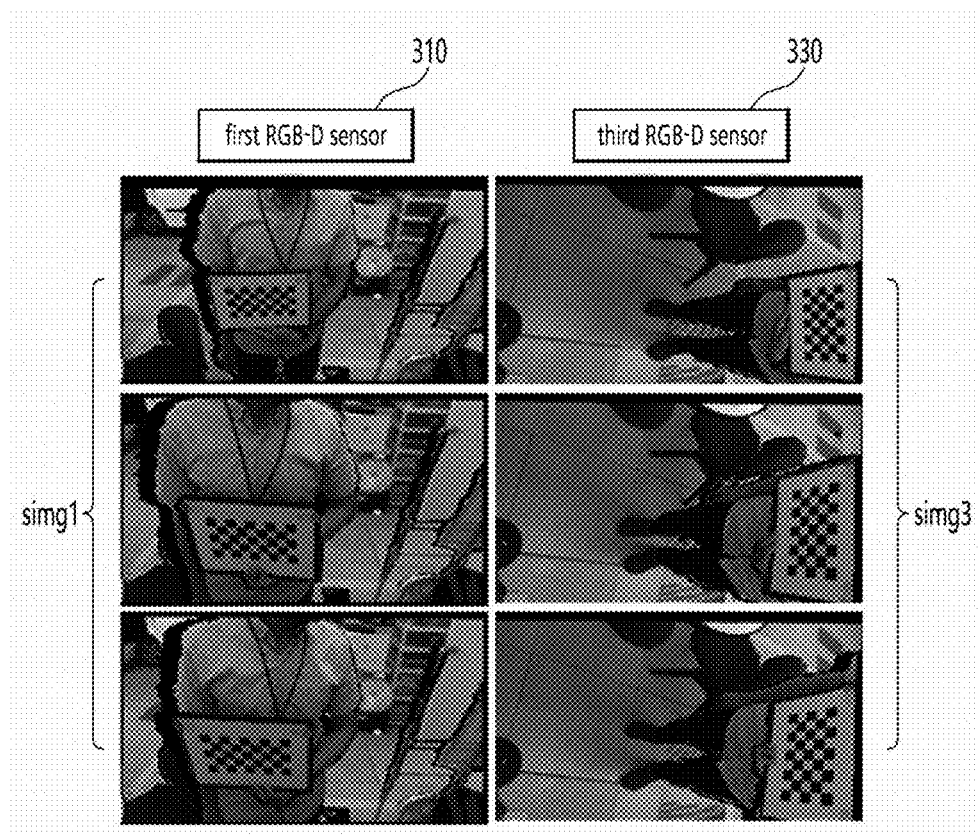
FIG. 10 is an example illustrating unifying of respective coordinate systems of the first image data and third image data in FIG. 8.
Figure 11:
FIG. 11 is an example illustrating the first image data to third image data in which the coordinate systems thereof are unified according to the examples of FIGS. 9 and 10.

FIG. 9 is an example of unifying the respective coordinate systems of the first image data and second image data in FIG. 8. FIG. 10 is an example of unifying the respective coordinate systems of the first image data and third image data in FIG. 8. FIG. 11 is an example illustrating the first image data to third image data in which the coordinate systems thereof are unified in accordance with the examples of FIGS. 9 and 10.

For reference, in the description of FIGS. 9 to 11, content that is the same or overlapping with the content described above may be omitted.

For reference, FIGS. 9 to 11 illustrate a process for unifying the coordinate systems of first to third image data having the coordinate systems different from each other, illustrate the coordinate system unification process performed by the above-described calculation device 400, and may represent step S1310 of merging the above-described first image data and the second image data to generate the merged image data including the image of the user's full body.

As shown in FIG. 9, a reference marker (e.g., a checker board) may be arranged in each area where the first image data and the second image data overlap. For example, a user photographed by the first RGB-D sensor 310 and the second RGB-D sensor 320 may carry the reference marker.

The reference marker may be a marker of a pre-arranged type. For example, the reference marker may be a checkerboard, and the checkerboard may have a checkered pattern. The calculation device 400 may obtain two-dimensional coordinate information and depth data of the checkered pattern of each checker board captured in the image data, and may obtain three-dimensional coordinate information of each checkered pattern on the basis of the two-dimensional coordinate information and the depth data.

For example, each of the first RGB-D sensor 310 and the second RGB-D sensor 320 may generate at least three or more pieces of image data. A position of a user captured in each video data may change each time. In the present specification, each image data generated to unify coordinate systems may be referred to as sub-image data simg1 to simg3.

The calculation device 400 may apply a conventionally known corner detection algorithm to each sub-image data simg1 to simg3. Through the corner detection algorithm, the calculation device 400 may extract N feature points for corner positions of the reference marker included in each of the sub-image data simg1 to simg3. The calculation device 400 may obtain two-dimensional coordinate information for each feature point.

In addition, the calculation device 400 may receive depth data from each of the first RGB-D sensor 310 and the second RGB-D sensor 320. For example, the calculation device 400 may obtain three-dimensional coordinate information for a position of each feature point by mapping between the two-dimensional coordinate information and data of each feature point extracted through the corner detection algorithm. However, in order to remove noise, the calculation device 400 may obtain average values of a plurality of pieces of coordinate information.

For example, the calculation device 400 may generate at least three or more pieces of sub-image data simg1 to simg3 through the first RGB-D sensor 310 and the second RGB-D sensor 320. Accordingly, the calculation device 400 may obtain 3×N pieces of three-dimensional coordinate information from the first RGB-D sensor 310 and the second RGB-D sensor 320. For example, coordinate information corresponding to one of corners of a reference marker (e.g., coordinate information obtained by the first RGB-D sensor 310 and coordinate information obtained by the second RGB-D sensor 320) should all represent the same position information. Accordingly, the calculation device 400 may apply a rotation matrix and a translation matrix to the three-dimensional coordinate information obtained from the second RGB-D sensor 320 by using an iterative closest point (ICP) algorithm. As a result of applying the rotation matrix and the translation matrix, the calculation device 400 may unify the three-dimensional coordinate information obtained from the second RGB-D sensor 320 and the three-dimensional coordinate information obtained from the first RGB-D sensor 310.

As shown in FIG. 10, a reference marker (e.g., a checker board) may be arranged in each area where the first image data and the third image data overlap. For example, a user photographed by the first RGB-D sensor 310 and the third RGB-D sensor 330 may carry the reference marker. Since the description of FIG. 10 is the same as or overlaps with the description of FIG. 9, it may be omitted for convenience of description. In the description of FIG. 9, those skilled in the art may understand the description of the second image data by replacing it with the description of the third image data, and may understand the description of the second RGB-D sensor 320 by replacing it with the description of the third RGB-D sensor 330.

As shown in FIG. 11, it is confirmed that the coordinate systems of the first image data img1 to the third image data img3 are unified, thereby generating merged image data img5. The merged image data img5 may be image data representing the user's full body on the basis of the two-dimensional coordinate information and the depth data. The calculation device 400 unifies and merges the coordinate systems of the first image data img1 to the third image data img3, and as a result, the calculation device 400 may generate the merged image data img5 representing the user's full body.

For example, step S1310 of generating the merged image data img5 including the image of the user's full body may include: receiving first sub-image data simg1 including a reference marker from the first RGB-D sensor 310; and receiving second sub-image data simg2 including the reference marker from the second RGB-D sensor 320.

In some cases, step S1310 of generating the merged image data img5 including the image of the user's full body may further include receiving third sub-image data simg3 including the reference marker from the third RGB-D sensor 330.

Step S1310 of generating the merged image data img5 including the image of the user's full body may include: mapping between the two-dimensional coordinate information and data of each of the feature points extracted from the first to third sub-image data simg1 to simg3 through the corner detection algorithm; and obtaining three-dimensional coordinate information for a position of each extracted feature point. The extracted feature points are feature points for the reference marker, and the obtained three-dimensional coordinate information may be coordinate information for the reference marker.

In addition, step S1310 of generating the merged image data img5 including the image of the user's full body may unifies the coordinate systems of the first sub-image data simg1 to third sub-image data simg3 according to the three-dimensional coordinate information about the reference marker.

Step S1310 of generating the merged image data img5 including the image of the user's full body may equally apply a coordinate system transformation standard, which has unified the coordinate systems of the first sub-image data simg1 to the third sub-image data simg3, to the first image data img1 to the third image data img3.

Thereafter, step S1320 of generating the merged image data including the image of the user's full body may generate the merged image data img5 by merging the first to third image data img1 to img3, which have a unified coordinate system. The merged image data img5 may be input image data for a learning model that will be described later.

Figure 12:
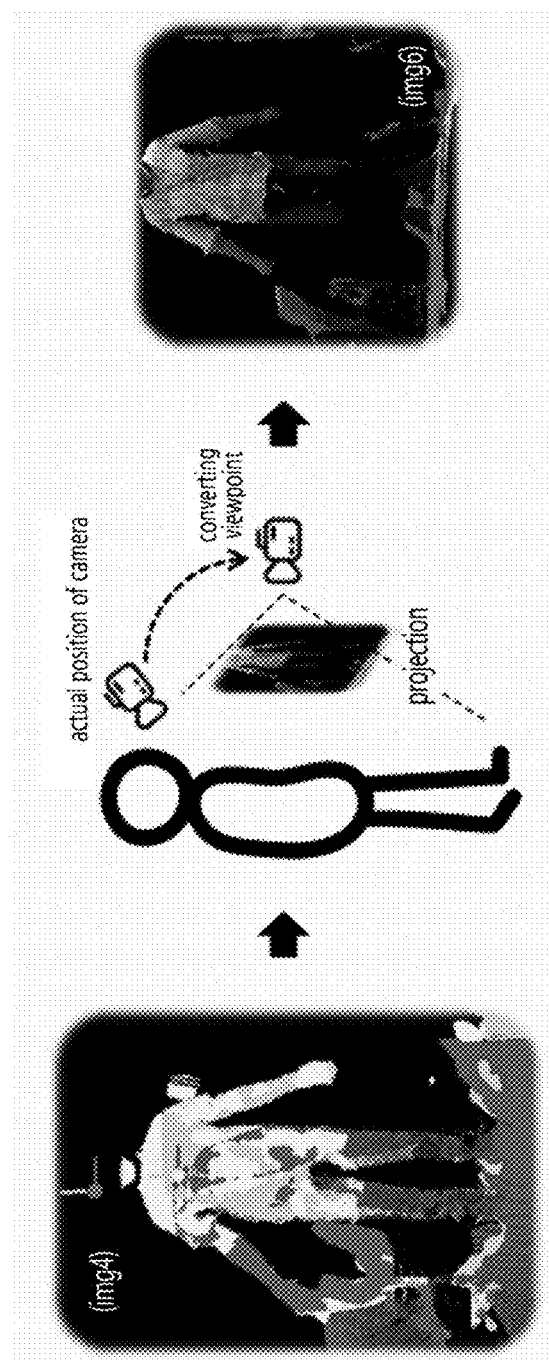
FIG. 12 is a view illustrating an example of converting a viewpoint of merged image data in FIG. 11.

FIG. 12 is a view illustrating an example of converting a viewpoint of merged image data in FIG. 11. For reference, FIG. 12 shows an example of converting the viewpoint of the merged image data by the calculation device, and may show an example illustrating a process of step S1320 of changing the viewpoint of the merged image data. For reference, in the description of FIG. 12, content that is the same or overlapping with the content described above may be omitted.

The merged image data img5 may be image data generated from viewpoints at which the user is viewed from positions where the plurality of sensors 300 are arranged. In order to input the merged image data img5 into the learning model, it is required to change the viewpoint of the merged image data img5 to a viewpoint at which the user is viewed from the front of the user. Here, the conversion of viewpoint may mean that a position of each RGB-D sensor is (virtually) moved to a virtual position.

For example, since the plurality of sensors 300 is mounted on the head-mounted device 100, the merged image data img5 may have the viewpoint facing the user from the height of the user's head, rather than from the front of the user. In order to input a more accurate image into the learning model, the viewpoint of the merged image data img5 may be required to be a viewpoint facing the user at a height parallel to a center position of the user's full body. Since the merged image data img5 has three-dimensional coordinate information including depth data, an actual position of each RGB-D sensor may be moved to a virtual position.

For example, the calculation device 400 may project the merged image data img5 into a virtual two-dimensional area. As a result, the viewpoint of the merged image data img5 may be changed in a desired direction. Since the merged image data img5 is projected as two-dimensional image data, depth data included in the merged image data img5 may be used to calculate an average of color values of the two-dimensional image data. As a result, the calculation device 400 may generate two-dimensional input image data by converting the viewpoint of the merged image data img5, and the merged image data img5 whose viewpoint has been converted may be similar to image data generated in an outside-in method (i.e., a method of installing an external sensor to obtain an image).

The merged image data img5 may be input to a learning model (e.g., DNN, etc.). Since the merged image data img5 is required to be input at an optimal size thereof to the learning model (e.g., DNN, etc.), the calculation device 400 may adjust the size of the merged image data img5.

For example, step S1320 of changing the viewpoint of the merged image data img5 may be a step of projecting the merged image data into a virtual two-dimensional area and changing, as a result, the viewpoint of the merged image data img5 in a desired direction. Additionally, the provision method after the viewpoint is changed may further include adjusting the size of the merged image data img5 to a preset size.

As shown in FIG. 12, the merged image data img5 whose viewpoint has been changed may be called full body image data img6.

Figure 13:
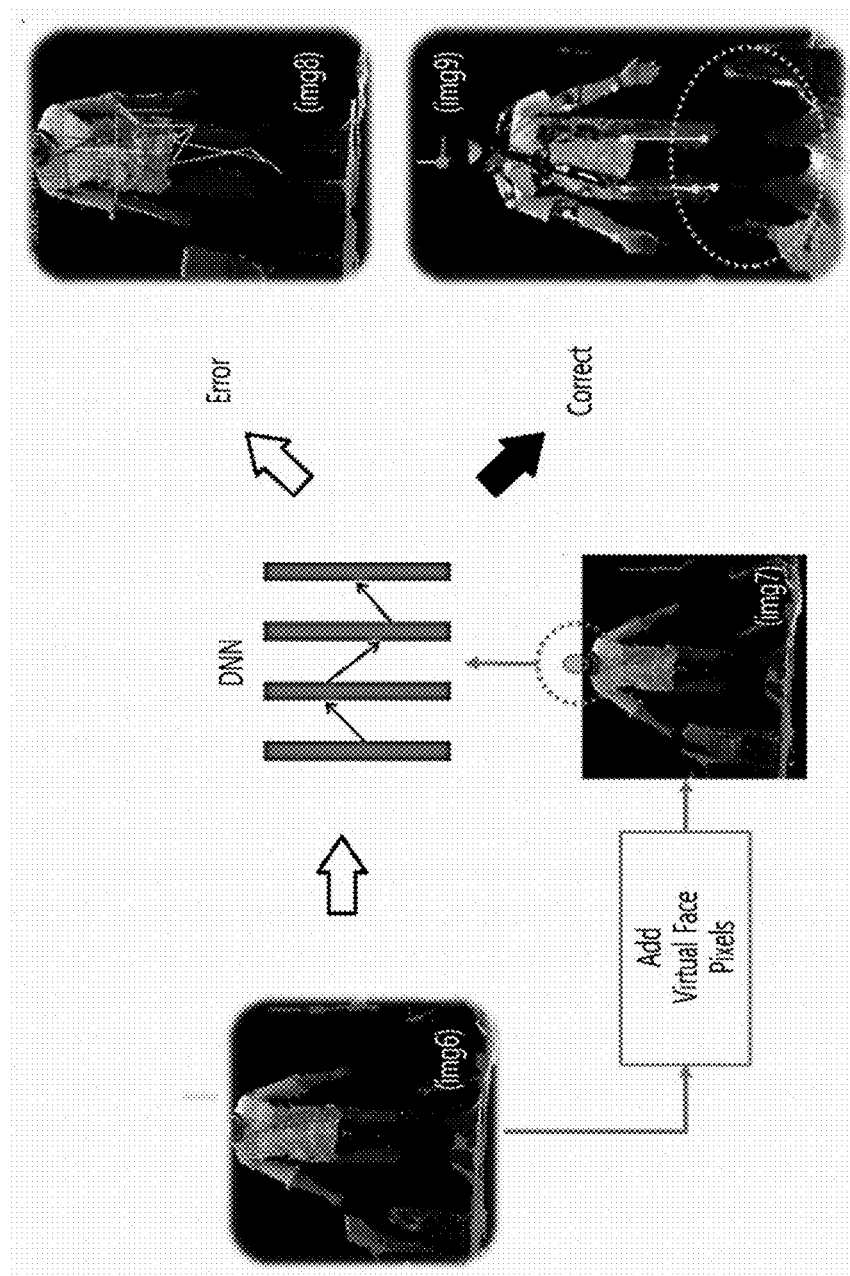
FIG. 13 is a view schematically illustrating a process of inputting a virtual face image to input image data in FIG. 12.

FIG. 13 is a view schematically illustrating a process of inputting a virtual face image to the input image data in FIG. 12.

For reference, FIG. 13 may show an example of a process in which the computing device 400 generates input image data img7 in order to input the merged image data img5 into the learning model. In addition, FIG. 13 may show an example of step S1330 of inputting a virtual face image corresponding to a user's face area into the merged image data img5.

For reference, in the description of FIG. 13, content that is the same or overlapping with the content described above may be omitted.

As shown in FIG. 13, in a case where the full body image data img6 without the virtual face image is input to the learning model, a skeleton image derived as result values of the learning model is highly likely an image img8 containing an error.

In comparison, in a case where a virtual face image is input to the full body image data img6, a skeleton image derived as result values of the learning model may include an accurate user skeleton image containing no error. The image data including the accurate skeleton image may be referred to as a first skeleton image img9.

The learning model may generally be a model that has learned video data or image data, as big data, obtained by photographing the user's full body. Accordingly, when image data that does not capture the user's face is input, derived output values have a very high probability of containing an error. In order to prevent this issue in advance, it is preferable to input a virtual face image corresponding to the user's face into the image data.

For example, the calculation device 400 may input a virtual face image corresponding to the user's face area into the full body image data img6 (or the merged image data img5). That is, the calculation device 400 may input the virtual face image corresponding to the user's face area into the full body image data img6 (or the merged image data img5), thereby generating input image data img7 to be input to the learning model. The input image data img7 may be image data in which the virtual face image is input into the above-described full body image data img6 (or the merged image data img5). The virtual face image may be an image consisting of a single dot or circle.

For example, the calculation device 400 may input, to the learning model, the input image data img7 to which the virtual face image is input, and obtain the first skeleton image img9 of the user from the learning model. As confirmed in FIG. 13, the first skeleton image img9 does not contain an error.

Figure 14:
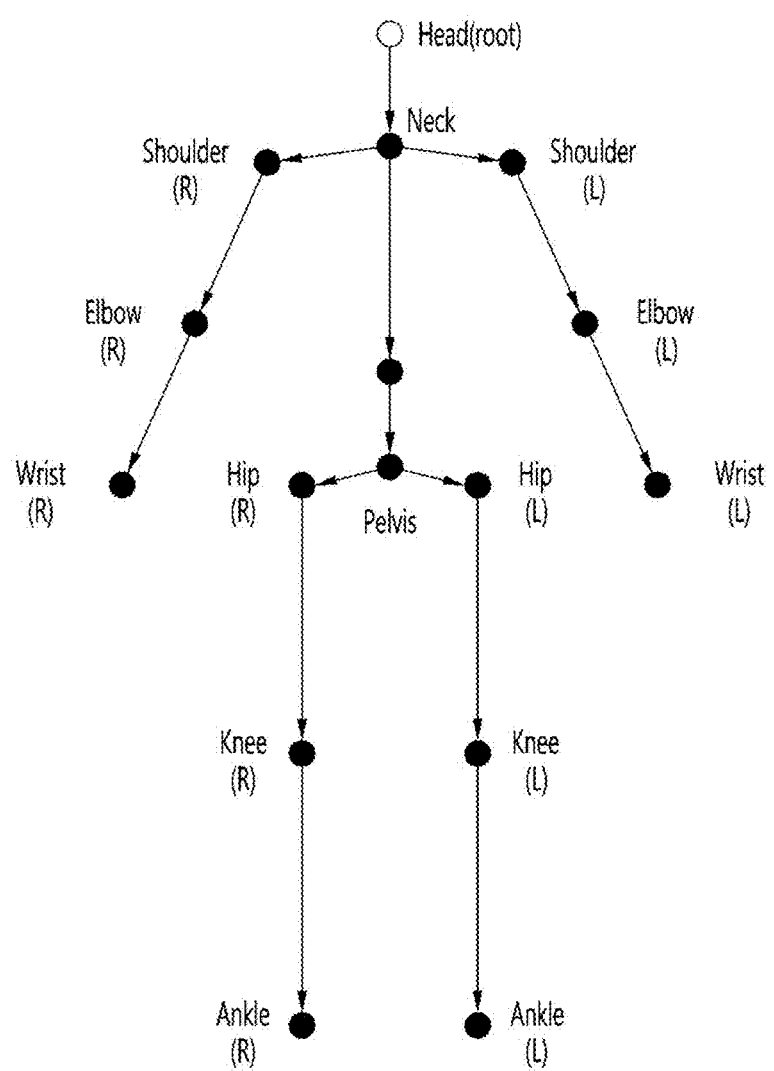
FIG. 14 is a view schematically illustrating an example of a skeleton image in FIG. 13.

FIG. 14 is a view schematically illustrating an example of a skeleton image in FIG. 13.

For reference, in the description of FIG. 14, content that is the same or overlapping with the content described above may be omitted.

The skeleton image may include information defining, each of joints as one node, such as the head, neck, chest, pelvis, shoulders, elbows, wrists, hips, knees, and ankles. In the skeleton image, the nodes may be classified into nodes positioned to the left of a user and nodes positioned to the right of the user, which are centered on a vertical virtual line passing through a head joint.

Figure 15:
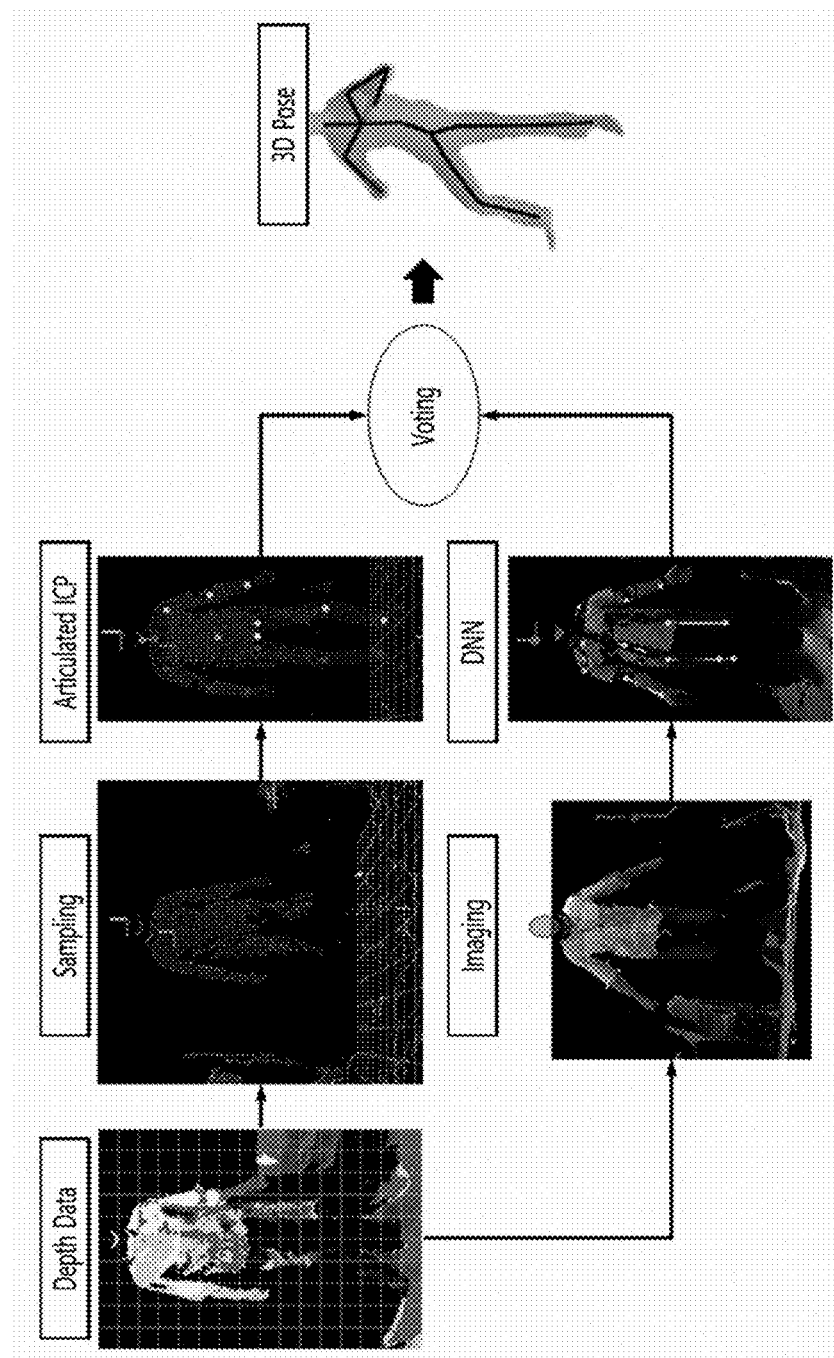
FIG. 15 is a view illustrating an example of a process for obtaining posture information of the user according to the present disclosure.

FIG. 15 is a view illustrating an example of a process for obtaining posture information of a user according to the present disclosure.

For reference, FIG. 15 shows an example of a process in which the calculation device 400 obtains the posture information of the user, or shows an example of a step of obtaining the posture information of the user in the provision method.

For reference, in the description of FIG. 15, content that is the same or overlapping with the content described above may be omitted.

As shown in FIG. 15, the calculation device 400 may obtain the posture information of the user on the basis of one of a first skeleton image img9 and a second skeleton image img11.

The second skeleton image img11 obtained by the calculation device 400 may be generated by the Articulated-ICP. For example, the calculation device 400 may define a virtual face image as the highest level joint node and obtain the second skeleton image img11 including the highest joint node and lower joint nodes.

For example, the present disclosure is characterized in that sensors are attached to the head of a user, so a virtual face image (e.g., a head joint) is set as the highest level node. The RGB-D sensors are mounted on the head-mounted device 100 of the user, so the RGB-D sensors move with the user's head. Accordingly, the calculation device 400 may easily obtain position information (i.e., coordinate information) of the highest level node, which is the virtual face image, on the basis of the coordinate information corresponding to the same height position as that of the RGB-D sensors.

For example, the calculation device 400 may find the lower level joints on the basis of position information and depth data of the highest level node, which is the virtual face image. The calculation device 400 may perform ICP calculation in order to obtain position information on each of the lower joint nodes belonging to the highest level joint node. Since a joint start position is fixed, the calculation device 400 may only calculate a rotation matrix when the Articulated-ICP is calculated.

For example, a calculation order of the Articulated-ICP calculation may include a sequence of the head→neck-→chest→pelvis, a sequence of the neck→shoulders→elbows→wrists, and/or a sequence of the pelvis→hips→knees→ankles. The calculation device 400 may obtain the second skeleton image img11 by reflecting length information of the user's joints. The length information of the user's joints may be information based on anthropometric measurement data according to the user's height.

For example, in order to overcome a disadvantage of slow Articulated-ICP calculation, the calculation device 400 may generate sample image data img10 to be input to the articulated-ICP. The calculation device 400 may reduce the number of points constituting the input image data through sampling in order to reduce a computational load. A grid size of the sample image data img10 may be set arbitrarily, and the grid size of the sample image data img10 in FIG. 15 is set to 2 cm.

The calculation device 400 may generate the second skeleton image img11 by performing the Articulated-ICP calculation on the sample image data img10. The calculation device 400 may select one of the first skeleton image img9 and the second skeleton image img11 through a voting algorithm. The voting algorithm may use a conventionally known algorithm.

The calculation device 400 may obtain the posture information of the user on the basis of one skeleton image selected from among the first skeleton image img9 and the second skeleton image img11. The calculation device 400 may generate an interaction image corresponding to the user on the basis of the obtained posture information of the user. The calculation device 400 may provide a virtual reality service by using the generated interaction image.

For example, step S1400 of obtaining the posture information of the user may include selecting one of the first skeleton image img9 and the second skeleton image img11 by using the voting algorithm. For example, the voting algorithm may be performed through a conventionally known KNN-based voting classifier, and classification based on predetermined criteria may be performed. For example, the selecting of one of the skeleton images by using the voting algorithm may be a step of selecting one image satisfying a preset standard in order to generate an interaction image.

Figure 16:
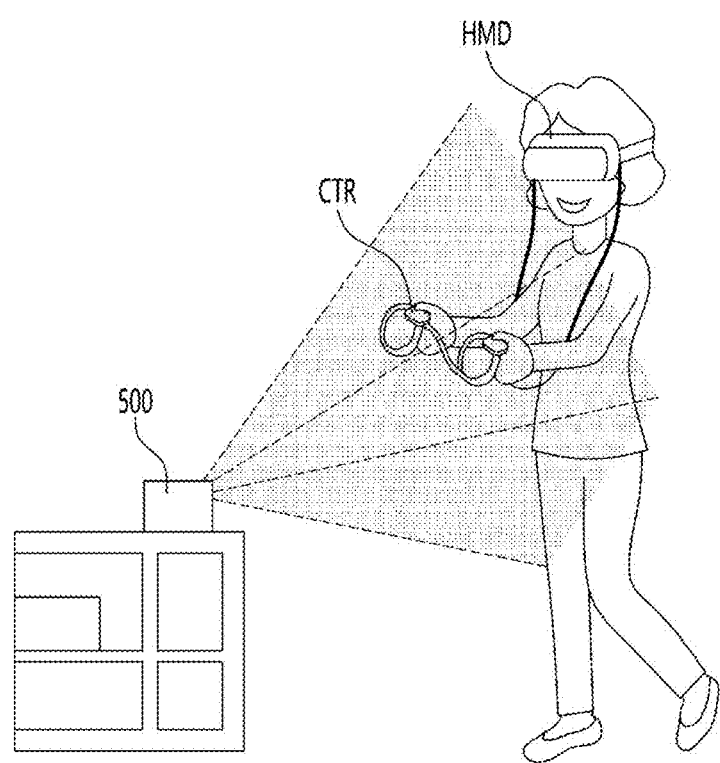
FIGS. 16 and 17 are views illustrating respective examples of a system for providing a virtual reality service according to a comparative example.
Figure 17:
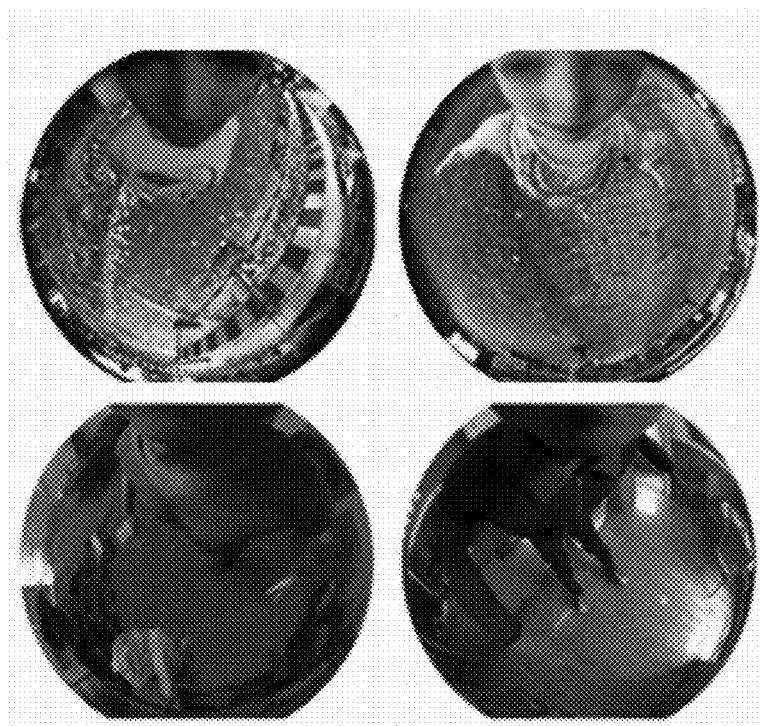

FIGS. 16 and 17 are views illustrating respective examples of a system for providing a virtual reality service according to a comparative example.

As shown in FIG. 16, in the system for providing the virtual reality service according to a comparative example, sensors for detecting a user may be installed separately rather than in a VR device. As such, in a case where the sensors for detecting the user is fixedly installed at a specific position, the user is unable to escape a detection range of the sensors that detect the user. Therefore, the virtual reality service that may be provided to the user has a problem of being limited by the detection range of the sensors.

As shown in FIG. 17, the system for providing the virtual reality service according to a comparative example may also utilize a sensor including a fisheye lens to obtain an image of a user's full body and provide a virtual reality service on the basis of the obtained image. However, although the sensor including the fisheye lens has an advantage of being easy to install in a VR device, it has a problem of causing serious distortion of the user's full body.

As described above, the system and method for providing the virtual reality service according to the exemplary embodiment of the present disclosure may provide a means to solve all the problems according to the comparative examples, and may provide an interaction image that accurately and quickly reflects the motion of the user.

The present disclosure has been described with reference to the exemplary embodiment shown in the drawings, but these are merely exemplary, and those skilled in the art will appreciate that various modifications and other equivalent embodiments are realizable. Therefore, the true technical protection scope of the present disclosure will be defined by the technical spirit of the appended claims.

What is claimed is:
1. A system for providing a virtual reality service, the system comprising:
   a head-mounted device mounted on a head of a user;
   a first RGB-D sensor configured to be installed on the head-mounted device, generate first image data of the user, and be arranged to face the user;
   a second RGB-D sensor configured to be installed on the head-mounted device, generate second image data of the user, and be arranged to face the user;
   a third RGB-D sensor configured to be installed on the head-mounted device, generate third image data of the user, and be arranged to face the user; and
   a calculation device configured to obtain a skeleton image of the user on the basis of the first image data and the second image data, obtain posture information of the user on the basis of the skeleton image of the user, and generate an interaction image on the basis of the posture information of the user,
   wherein the first image data comprises an image of an upper half of the user's body,
   the second image data comprises an image of a lower half of the user's body viewed from a first direction, and
   the third image data comprises an image of the lower half of the user's body viewed from a second direction.

2. The system of claim 1, wherein the calculation device unifies a coordinate system of the first image data and a coordinate system of the second image data into one coordinate system.

3. The system of claim 2, wherein the calculation device merges the first image data and the second image data to generate merged image data comprising an image of the user's full body, and changes a viewpoint of the merged image data.

4. The system of claim 3, wherein the calculation device inputs a virtual face image corresponding to a face area of the user into the merged image data.

5. The system of claim 4, wherein the calculation device inputs the merged image data comprising the input virtual face image into a learning model and obtains a first skeleton image of the user from the learning model.

6. The system of claim 5, wherein the calculation device defines the virtual face image as the highest level joint node and obtains a second skeleton image comprising lower level joint nodes defined on the basis of the highest level joint node.

7. The system of claim 6, wherein the calculation device obtains the posture information of the user on the basis of one of the first skeleton image and the second skeleton image.

8. The system of claim 1, wherein the calculation device obtains the skeleton image of the user on the basis of the first image data to the third image data.

9. A method for providing a virtual reality service to a user on the basis of image data received from a plurality of sensors installed on a head-mounted device mounted on the user's head, the method comprising:
receiving first image data comprising an image of an upper half of the user's body from a first RGB-D sensor among the plurality of sensors;
receiving second image data comprising an image of a lower half of the user's body viewed from a first direction from a second RGB-D sensor among the plurality of sensors;
receiving third image data comprising an image of the lower half of the user's body viewed from a second direction intersecting the first direction from a third RGB-D sensor among the plurality of sensors;
obtaining a skeleton image of the user on the basis of the first image data and the second image data;
obtaining posture information of the user on the basis of the skeleton image of the user; and
generating an interaction image on the basis of the posture information of the user.

10. The method of claim 9, wherein the obtaining of the skeleton image of the user unifies a coordinate system of the first image data and a coordinate system of the second image data into one coordinate system.

11. The method of claim 10, wherein the obtaining of the skeleton image of the user comprises:
merging the first image data and the second image data to generate merged image data comprising an image of the user's full body; and
changing a viewpoint of the merged image data.

12. The method of claim 11, wherein the obtaining of the skeleton image of the user further comprises:
inputting a virtual face image corresponding to a face area of the user into the merged image data after the viewpoint is changed.

13. The method of claim 12, wherein the obtaining of the skeleton image of the user further comprises:
inputting the merged image data comprising the input virtual face image into a learning model and obtaining a first skeleton image from the learning model.

14. The method of claim 13, wherein the obtaining of the skeleton image of the user further comprises:
defining the virtual face image as the highest level joint node and obtaining a second skeleton image comprising the highest level joint node and lower level joint nodes.

15. The method of claim 14, wherein the obtaining of the posture information of the user further comprises:
obtaining the posture information of the user on the basis of one of the first skeleton image and the second skeleton image.

16. The method of claim 9, wherein the obtaining of the skeleton image of the user obtains the skeleton image of the user on the basis of the first third image data to the third image data.

* * * * *